Nov. 1, 1927.  
D. HOLLIDAY  
1,647,568  
ROAD AUTO SIGNAL  
Filed Jan. 10, 1927
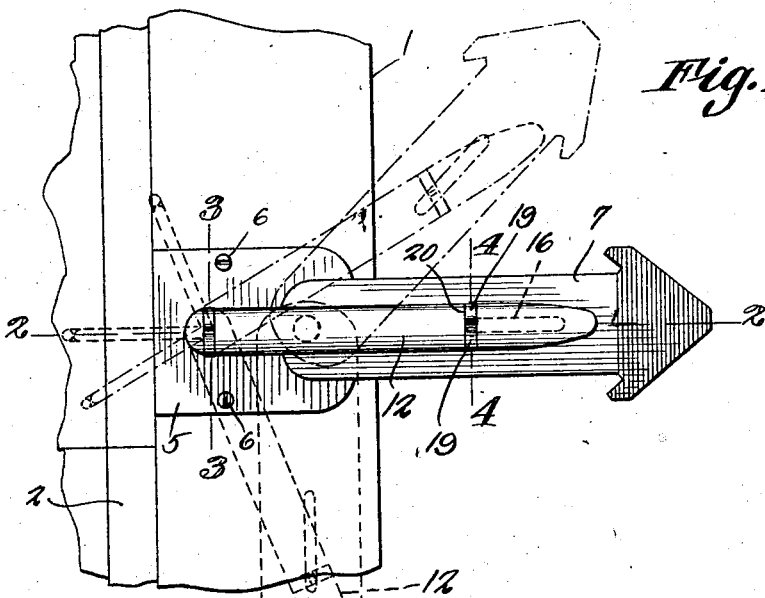
Fig. 1.
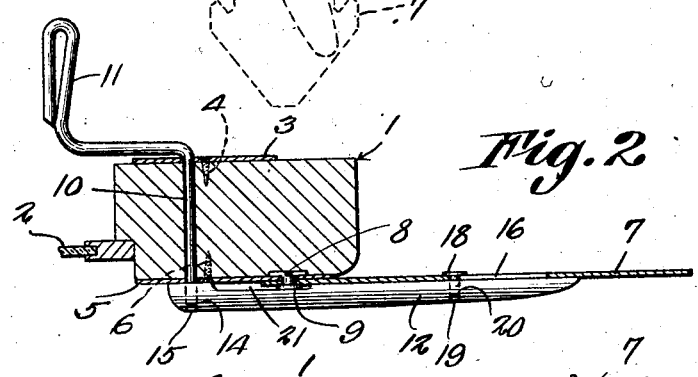
Fig. 2.
Fig. 4.
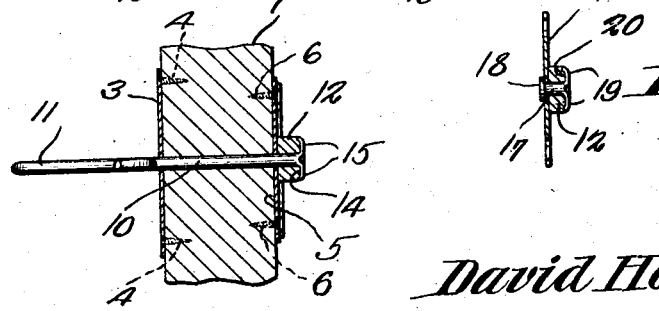
Fig. 3.
David Holliday  
Inventor  
By C. A. Snow & Co.  
Attorneys Patented Nov. 1, 1927.

1,647,568

UNITED STATES PATENT OFFICE.

DAVID HOLLIDAY, OF ST. PAUL, MINNESOTA.

ROAD AUTO SIGNAL.

Application filed January 10, 1927. Serial No. 160,238.

This invention aims to provide novel means for operating a signal on a motor car, to indicate the intentions of the driver of the car, relative to stopping, starting and the like.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in elevation, a device constructed in accordance with the invention, mounted on a portion of a motor-propelled vehicle;

Figure 2 is a section on the line 2—2 of Figure 1;

Figure 3 is a section on the line 3—3 of Figure 1;

Figure 4 is a section on the line 4—4 of Figure 1.

In carrying out the invention, there is provided a support 1, which may be a part of the frame work of an automobile, the windshield panel being shown at 2—although the device hereinafter described may be mounted upon any preferred, convenient, or accessible part of the vehicle.

To the inner surface of the support 1, a bearing plate 3 is secured as shown at 4. A bearing plate 5 is secured at 6 to the outer surface of the support 1. The numeral 7 marks a signal, which may be a metal plate of any desired outline, a pivot element 8, such as a rivet, joining the inner end of the signal 7 to the plate 5, so that the signal may swing vertically. The head of the rivet 8 is designated by the numeral 9 and cooperates with the outer surface of the signal 7.

A shaft 10 is mounted to rock in the support 1 and in the bearing plates 3 and 5. At its inner end, the shaft 10 is equipped with a crank 11, or any suitable means whereby the shaft may be rotated. The numeral 12 designates an arm overlapped on the signal 7, the forward end of the shaft 10 passing through the inner end of the arm 12. The arm 12 is supplied with a superficial transverse groove 14 in which are secured oppositely extended fingers 15 at the outer end of the shaft 10, the construction being such that the arm 12 is securely mounted upon the shaft 10, so that when the shaft 10 is rocked by means of the crank 11, swinging movement will be imparted to the arm 12. There is an elongated slot 16 in the signal 7. A connecting element 17 moves in the slot 16 of the signal 7 and is mounted in the arm 12. The connecting element 17 preferably is a rivet, having a head 18 cooperating with the rear surface of the surface 7, the connecting element or rivet 17 being equipped at its forward ends with fingers 19 which are received in, and secured in, a transverse groove 20 that is formed in the forward surface of the arm 12. In the inner surface of the arm 12 there is a recess 21 which enables the arm 12 to move with respect to the head 9 of the pivot element or rivet 8, the recess 21, moreover, permitting the rear or inner end of the signal 7 to move with respect to the arm 12, when the arm 12 is swung vertically.

In practical operation, the shaft 10 is rocked by means of the crank 11, or its equivalent, and vertical swinging movement is imparted to the arm 12. The connecting element 17, which is carried by the arm 12, moves in the slot 16 of the signal 7, and, thus, the signal 7 is swung vertically, with the rivet 8 as a center of swinging movement.

What is claimed is:—

In a device of the class described, a support, a shaft journaled in the support, an arm secured to the shaft, a signal, a pivot element connecting one end of the signal with the support, in spaced relation to the shaft, the pivot element having a head which retains the signal for swinging movement, and a combined pivotal and slidable connection between the signal and the arm, the arm being provided on its inner surface with an elongated transverse recess receiving both the head of the pivot element and the inner end of the signal, to permit relative movement between the arm on the one hand, and the head of the pivot element and said end of the signal on the other hand.

In testimony that I claim the foregoing as my own, I have hereto affixed my signature.

DAVID HOLLIDAY.